United States Patent Office 3,463,979
Patented Aug. 26, 1969

3,463,979
APPARATUS FOR SUPPRESSING SPURIOUS SIGNALS IN PROCESS CONTROL EQUIPMENT
David C. H. Scobie, Kilmacolm, and James Anderson Scott, Stevenston, Scotland, assignors to Imperial Chemical Industries Limited, London, England, a corporation of Great Britain
Filed July 14, 1966, Ser. No. 565,119
Claims priority, application Great Britain, July 26, 1965, 31,779/65
Int. Cl. H02p 1/54, 5/46, 7/68
U.S. Cl. 318—18                                    14 Claims

ABSTRACT OF THE DISCLOSURE

Process control apparatus includes two potentiometers on which two consecutive signals of a continuous sequence of process control signals are represented as the respective positions of the potentiometer sliders, and the potentiometers are connected in a bridge circuit so that the potential difference between the sliders is proportional to the difference between the consecutive control signals. A means is provided to respond to the potential difference to suppress the later of the two consecutive signals when the potential difference exceeds a predetermined value.

---

This invention relates to process control apparatus adapted to prevent the application of spurious intermittent control signals to process control.

Process control apparatus operating on stepwise control signals derived from sampled measurements is becoming widely used in industry and especially in chemical industry. The control signal is generated by a process condition such as, for example, the concentration of a particular reaction product, which might be indicated as a signal from an automatic analyser such as a gas phase chromatograph, and the signal is fed to process control equipment. Often the signal is not fed directly but is operated upon by complicated equipment. Inevitably there is a risk of a transient or permanent fault arising in the signal generating or processing equipment giving rise to spurious control signals which, if applied to the process, could be harmful.

It is an object of the present invention to provide apparatus to monitor stepwise control signals so as to prevent unduly faulty control signals being applied to the process being controlled.

In accordance with this invention process control apparatus for continuously monitoring a series of stepwise process control signals comprises means for continuously detecting said signals and means responsive to the difference between two consecutive signals to suppress the later signal when the difference exceeds a predetermined value.

The value of signal increment which is predetermined as being appropriate to a valid signal is characteristic of the process being controlled and can be selected in accordance with the known behaviour of the process. When a control signal is found to differ excessively from the immediately previous signal it is not applied to the process control, the process control being continued at a rate appropriate to said previous signal until a valid control signal is obtained or some overriding control action is taken.

In one convenient form of the invention the signal detecting means comprises two potentiometers on which two consecutive signals, one on each potentiometer, are indicated as the respective positions of the potentiometer sliders, the two potentiometers being connected in a bridge circuit so that the potential difference between the sliders is proportional to the difference between the consecutive control signals, and is operative to actuate the signal suppressing means. Any one or both of the potentiometers may be utilised to generate the process control signal.

The two potentiometers may, if desired, be used respectively to detect and store the control signals and for this purpose potentiometer resetting means operative on receipt of a satisfactory control signal are provided to adjust the slider of the storage potentiometer from a position corresponding to the earlier signal to a position corresponding to the position of the detector potentiometer receiving the later signal, thereby to store the later signal and to release the detector potentiometer, on which this later signal is received, for receiving the next control signal.

The potentiometers are conveniently of the kind having servo-driven sliders.

The signal suppression means responsive to the difference between consecutive signals may comprise a Schmitt trigger circuit connected to the process control circuit and arranged to receive a signal corresponding to the said difference and to "trigger" to a condition to suppress the process control signal if the difference signal exceeds the predetermined value. A signal corresponding to the difference between consecutive signals, obtained from the aforementioned potentiometer sliders, may conveniently be applied to the Scmitt trigger circuit through a differential amplifier, and the Schmitt trigger circuit may operate on the process control circuit through an electro-magnetic relay which is arranged, on actuation, to prevent the alteration of the process control setting.

The apparatus of the invention advantageously also comprises alarm means responsive to the receipt of a first or a predetermined number of consecutive faulty signals. The alarm may conveniently be actuated by the "triggering" of the aforementioned Schmitt trigger circuit and may, for example, comprise an electromagnetic relay in circuit with means to indicate or record its actuation.

Control apparatus, which suppresses a process control signal of greater value than could occur during process operation, may, in some cases, operate to prevent proper alignment of the controller with the process when the controller is being put into operation, since a truly large change may be obtained between the first measured control signal and an already stored signal, which change requires a consequential large alteration in process control setting. It is advantageous therefore, for the control apparatus of the present invention to provide means to override the actuation of the control signal suppression means for an initial control cycle to allow the process to establish characteristic process conditions. The override means may comprise relay-locking means to prevent actuation of the electromagnetic relay associated with the process control signal, which locking means may be arranged to lock the relay initially and to unlock the relay automatically after the receipt of one or more control signals. The relay-locking means may, for example, comprise a transistorised switching circuit and a bistable circuit which is arranged to alter its conducting conditions so as to permit actuation of the electromagnetic relay after the desired interval. The switching circuit may be manually actuated and arranged to be re-set automatically after an initial control cycle.

In order to further illustrate the invention a preferred embodiment will now be described, by way of example, with reference to the accompanying drawings in which.

Figure 1:
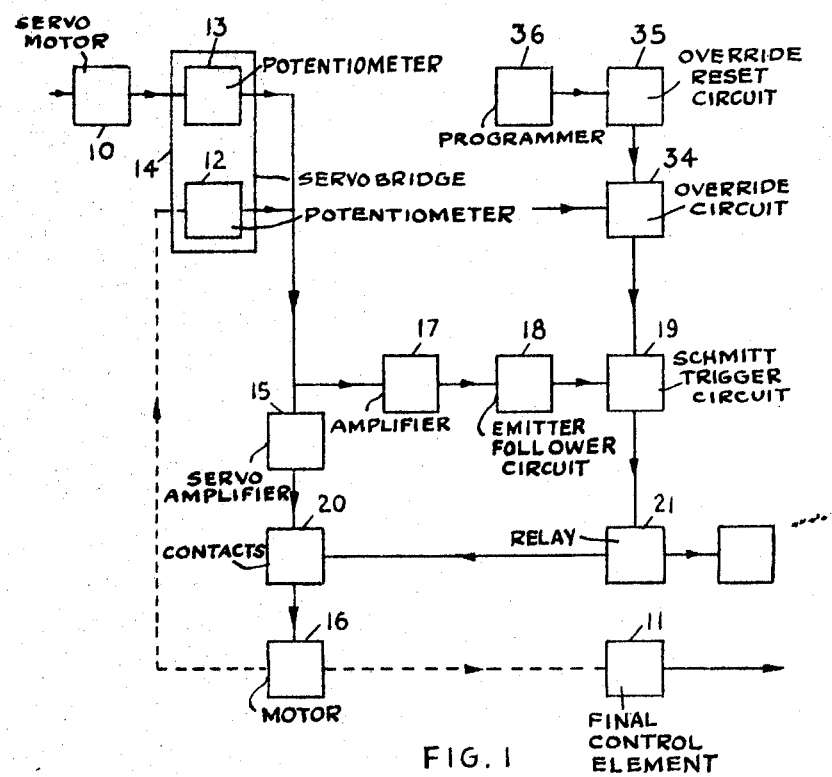
FIG. 1 is a block schematic diagram of one arrangement of process control apparatus according to the invention.

In the apparatus shown in FIG. 1 the position of the final control element 11, derived from a sample measurement of a process variable, is stored by the position of a slider on a servo-driven potentiometer 12, and the new position to which the final control element 11 has to be moved, derived from the next sampled measurement of the process, is denoted by the position of the slider on a servo-driven potentiometer 13, driven by a servo-motor 10. A servo-bridge 14 is used to compare the positions of the sliders of the potentiometers 12 and 13 and a servo-amplifier 15 and motor 16 are provided to drive the potentiometer 12 and the final control element 11 to the new position corresponding to the latest sample, thereby leaving the servo-driven potentiometer 13 free to receive the next control signal derived from the subsequent sample.

The output of the servo-bridge 14 goes to a D.C. differential amplifier 17, the output of which is operated upon by an emitter follower circuit 18 arranged such that its output is a unidirectional signal proportional to the magnitude but independent of the sign of its input. This signal then goes to the input of a Schmitt trigger circuit 19 which is operated if this input signal exceeds a preset level and normally closed contacts 20 on an electromagnetic relay 21, operated by the Schmitt trigger circuit 19, are used to prevent the output of the servo-amplifier 15 from driving the servo-motor 16 and moving the position of the final control element 11 and the servo-driven potentiometer 12.

Figure 2:
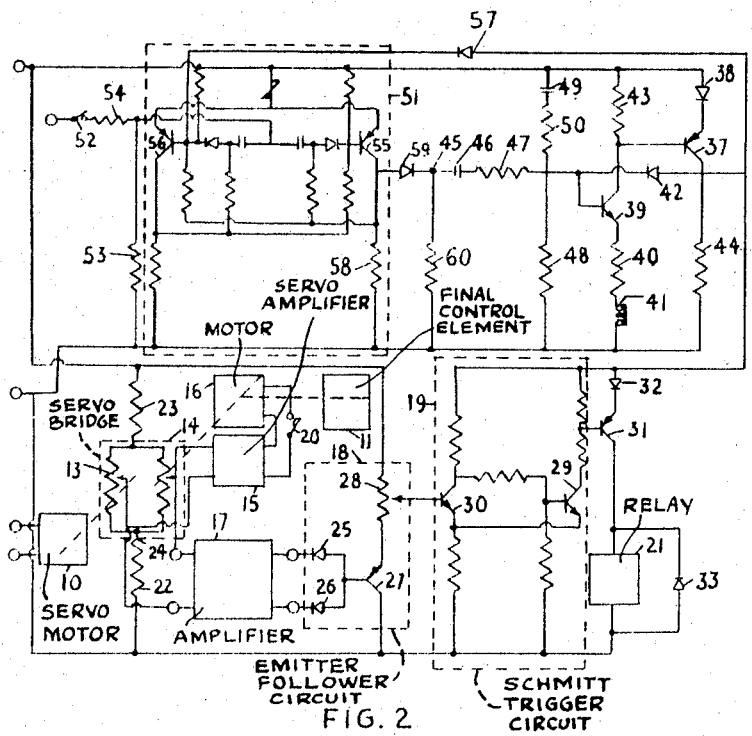
FIG. 2 is an outline circuit diagram of the arrangement shown in FIG. 1.

Referring to FIG. 2, which shows the circuitry of the apparatus, the control signal corresponding to the latest but one sample is stored on the servo-driven potentiometer 12, which is also coupled to the final control element 11, by the position of the slider on the potentiometer, and that corresponding to the latest sample is formed by the position of the slider of the servo-driven potentiometer 13. The potentiometers are arranged to form the servo-bridge 14 and a potential difference is applied between the two common junctions of potentiometers 12 and 13. This potential is applied from a common regulated +24 v. power supply and dropping resistors 22 and 23 are chosen such that the voltage across the servo-bridge 14 is about 1.5 v. while junction 24 is about +6 v. with respect to the zero voltage line. With this arrangement, the magnitude of the voltage difference between the sliders of the potentiometers 12 and 13 is a measure of the difference between the control signals derived from the latest and the latest but one samples, and this voltage difference is applied to the input of the differential amplifier 17.

If the signal is smaller than the present value, both the servo-driven potentiometer 12 and the final control element 11 are driven to a new position corresponding to the position of potentiometer 13, the former storing the new value of the signal for comparison on the subsequent analysis cycle.

The differential amplifier 17 is a standard transistorised differential amplifier consisting of two stages. It is designed to have an overall gain of 200 and the mean value of the output voltage is designed to be constant at about +6 v., being independent of the mean value of the input voltage which may vary in the range +4 v. to +8 v.

The emitter follower circuit 18 comprises two semiconductor diodes 25 and 26 with their anodes connected to the base of a p-n-p type transistor 27. The equivalent cathodes of the diodes are connected to the output of the differential amplifier 17, and the emitter of the transistor 27 is connected by a potentiometer 28 to the common regulated +24 v. power supply. When base current flows in transistor 27, via the appropriate diode according to the polarity of the differential amplifier output, the base potential, and hence the emitter potential, becomes approximately equal to the more negative side of the differential amplifier output. This means that the emitter potential (with respect to the zero voltage line) is a measure of the magnitude but is independent of the polarity of the differential amplifier output and hence of the comparison bridge output.

The slider of the potentiometer 28 is connected to the input of the standard Schmitt trigger circuit 19, which has "backlash" designed into it. The circuit is designed to switch to the "ON" position, defined by transistor 29 conducting and transistor 30 cut off, if the input to it goes more negative than +8.5 v. and to switch to the "OFF" position, defined by the transistor 29 cut off and the transistor 30 conducting, once the voltage goes more positive than +10 v. The circuit will then remain in the "OFF" position until the voltage once again goes more negative than +8.5 v. The position of the slider of the potentiometer 28 determines the output required from the differential amplifier to switch the Schmitt trigger circuit 19. If the slider is in a position near the junction of the potentiometer 28 and the emitter of the transistor 27, it will require a smaller output voltage from the differential amplifier 17 to bring the input to the trigger circuit 19 more negative than +8.5 v. than if the slider is at the end remote from the transistor 27. The setting of the potentiometer 28 therefore determines the magnitude of the preset value above which a signal will be prevented from being applied to the process. The output of the Schmitt trigger circuit is used to switch a p-n-p type transistor 31, the collector load of which is the electromagnetic relay 21. When the Schmitt trigger circuit 19 is in the "ON" position the transistor 29 is held in the conducting state allowing the transistor 31 to conduct, energising the relay 21. When the Schmitt trigger circuit 19 is in the "OFF" position, the transistor 29 is not conducting and the transistor 31 is held off, causing the relay 21 to be de-energised. A semiconductor diode 32 is added to ensure that when the transistors 29 and 31 are not conducting, leakage current in the emitter of the transistor 31 is kept to a minimum since any leakage current flowing causes a voltage drop to occur across the diode 32, which in turn causes a reverse bias to be applied to the emitter-base junction of the transistor 31. A diode 33 is included to suppress the back E.M.F. generated as the coil of the relay 21 is de-energised, allowing the armature of the relay to move immediately the coil is de-energised.

Normally closed contacts 20 of the relay 21 are used to interrupt the supply to the servo-motor 16 which drives the final control element and hence, when the Schmitt trigger circuit 19 is switched to the "ON" position, the final control element 11 does not alter the process conditions, maintaining these at their previous values.

Associated equipment, which is designed to override the suppression of a correcting signal which differs from the previous signal by an amount greater than could be demanded by a change in the process itself, is also shown in the block diagram FIG. 1. This equipment is included so that any large change which may be necessary to align the controller to the prevailing process conditions at start-up can be applied when the controller output has a random relationship to the process conditions. This override is effective only for one analysis cycle after being activated, being automatically reset by signals derived from the analyser cycle programmer.

The equipment consists of an override circuit 34, which is activated manually, and an override reset circuit 35 which automatically resets the override circuit after a certain period of time derived from an external timer which may conveniently be the analyser programmer 36. Suppression is effected in this instance by cutting off the power supply to the Schmitt trigger circuit 19 and the relay 21, hence preventing any suppression signal from interrupting the supply to the servo-motor 16.

The apparatus used to carry out the overriding and the automatic resetting is shown in FIG. 2. The current required to operate the Schmitt trigger circuit 19 and its associated relay 21 is supplied through a pnp type transistor 37 which is arranged with its emitter connected to the equivalent cathode of a diode 38, the anode of which is connected to the +24 v. common regulated power supply, and its collector connected to the supply line of the Schmitt trigger circuit. Thus if the transistor 37 is not conducting, the trigger circuit is rendered inoperative and under these conditions, the electromagnetic relay 21, driven by the Schmitt trigger circuit cannot operate and no control signal can be prevented from being applied to the process.

The base of the transistor 37 is connected to the collector of an npn type transistor 39 whose emitter is connected via an emitter resistance 40 and normally closed contacts of a pushbutton switch 41 to the zero voltage line. The base of the transistor 39 is connected to the equivalent cathode of a diode 42, the anode of which is connected to the collector of the transistor 37.

The transistors 37 and 39 form a compounded pair such that if a positive pulse of a few volts magnitude is applied to the base of the transistor 39, the transistor begins to conduct, which in turn causes the transistor 37 to conduct also. The diode 42 provides a positive feedback path which ensures that when the transistor 37 begins to conduct, the transistor 39, and hence the transistor 37 itself, become fully conducting. The two transistors will remain in the conducting condition until the pushbutton switch 41 is operated, causing the emitter current of the transistor 39 and therefore the base current of the transistor 37 to be cut off. The transistors will, after the operation of the pushbutton switch 41, remain cut off (and hence the Schmitt trigger circuit 19 will remain inoperative) until a positive pulse is again applied to the base of the transistor 39.

A resistor 43 connected between the base of the transistor 37 and the +24 v. supply line, ensures that the transistor 37 is completely cut off when the transistor 39 is not conducting. Any leakage current which tends to flow in the emitter of the transistor 37 causes a voltage drop across the diode 38, which in turn causes a reverse bias to be applied to the emitter-base junction of the transistor 37. A load resistor 44 is included to ensure that, even if the Schmitt trigger circuit is not connected, the transistor 37 still operates into a finite load.

A positive pulse can be applied to the base of the transistor 39 by applying a positive going step change in voltage at junction 45. The step change in voltage is differentiated to form a pulse by a resistance-capacitance network formed by a capacitor 46 and resistors 47 and 48, the capacitor 46 and resistor 47 being connected in series between the source of the positive step change in voltage and the base of the transistor 39, and the resistor 48 being connected between the base of the transistor 39 and the zero voltage line. A capacitor 49 and a resistor 50, whose values are equal to the capacitor 46 and the resistor 47, respectively, are placed in series between the +24 v. supply line and the base of the transistor 39 in order that, when the power supply to the circuit is initially switched on, the resulting positive going step applied to the capacitor 49 means that the transistors 37 and 39 will be in their conducting condition.

The override resetting circuit 35 also shown in FIG. 2 is designed to provide the positive going voltage step required to reset the override circuit after it has permitted one control signal, subsequent to the activation of the override circuit, to be applied to the process. It consists basically of a standard transistorised bistable circuit 51, as shown in FIG. 2, which is operated by the positive going edge of voltage signals (+24 v. in magnitude) which are derived from the analyser programmer 36 once per analysis cycle, indicated by normally open contacts 52. Resistors 53 and 54 form a potential divider to attenuate the driving signals applied to the bistable circuit 51.

Under normal operating conditions, when the suppression circuit is operative, the bistable circuit 51 is biased in the condition with transistor 55 conducting and transistor 56 cut off. This is achieved by applying a bias voltage of +24 v. to the base of the transistor 56 via a semiconductor diode 57 from the output of the override circuit, which is also the supply line to the Schmitt trigger circuit.

Thus, when the override circuit 34 is not activated, the bistable circuit 51 is biased permanently in the state described, but immediately after the override circuit has been activated, the 24 v. bias is removed from the base of the transistor 56 and the bistable circuit 51 is free to change its state on receipt of an input pulse obtained by closing the contacts 52. Thus the first positive going voltage step subsequent to the override activation causes the transistor 55 to be cut off and the transistor 56 to conduct and the voltage step applied during the subsequent analysis cycle will cause the circuit to revert to its original condition. As the transistor 55 begins to conduct a positive going voltage step appears across a resistor 58 and this positive going step is used to reset the override circuit as described previously. A semiconductor diode 59 and a resistor 60 are inserted between the bistable circuit and the override circuit so that only positive going pulses are transmitted.

In this manner it is ensured that the override remains activated for a period sufficient to include one, and only one, complete analysis cycle.

The aforerdescribed apparatus may be adapted to monitor more than one series of stepwise control signals by switching the outputs of different comparison bridges to the input of the differential amplifier comparison in sequence by means of electromagnetic relays, and simultaneously switching alternative potentiometers 28 in the emitter follower circuit to give different preset levels for determining the change in control signal value required to cause suppression of the current control signal.

Electromechanical relay operated alarm devices may be used in conjunction with the aforedescribed apparatus to provide indicating and alarm monitoring facilities of various kinds. The alarm circuits are activated by ocntacts of the relay 21 which is operated by the suppression signal.

Figure 3:
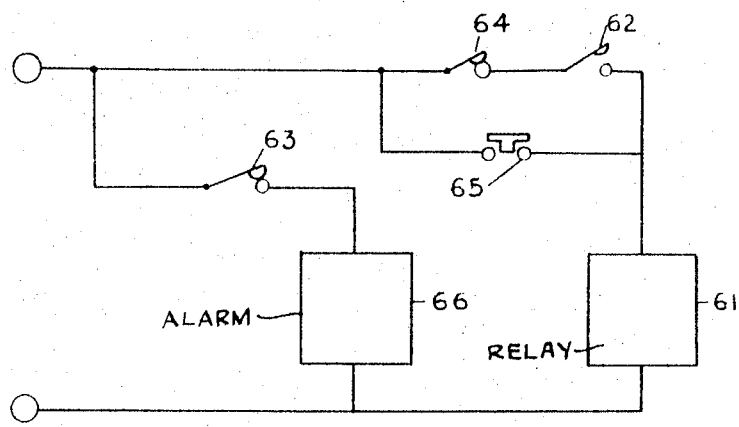
FIGS. 3, 4 and 5 are detail outline circuit diagrams of alarm devices suitable for inclusion in control apparatus of the invention.

The alarm circuit shown in FIG. 3 is a single alarm circuit which is activated as soon as any control signal is suppressed by the apparatus and which remains activated until manually acknowledged by pressing a reset button. The circuit comprises an electromagnetic relay 61, having normally open contacts 62 and normally closed contacts 63 which, under normal operating conditions, is energised via normally closed contacts 64 of the relay 21 and the contacts 62. When the contacts 64 are opened by operation of the suppression circuit, the relay 61 is de-energised and the contacts 62 open. The relay 61 remains de-energised until a pushbutton switch 65, bypassing the contacts 62 and 64, is closed. The contacts 63 of the relay 61 activate an alarm device 66 which may be a visual or aural indicator.

Figure 4:
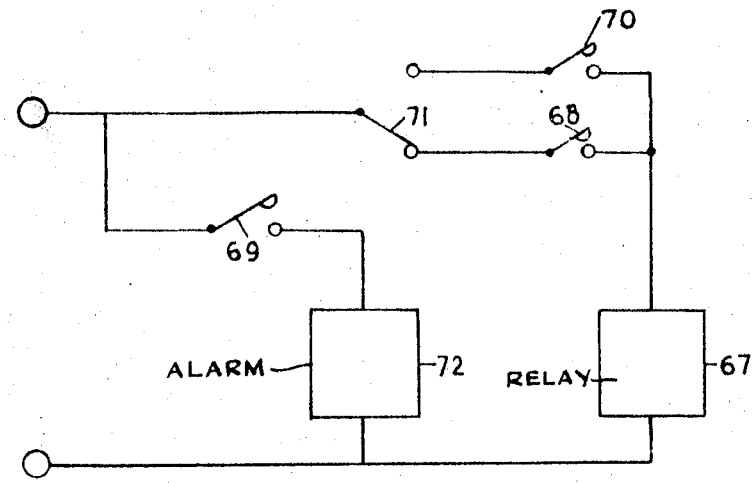

The alarm circuit shown in FIG. 4 is activated only for the duration of the suppression signal and is automatically reset. This type of alarm may conveniently be used to record the duration of the suppression signal, for example, by energising an event pen on an analyser recorder, thus facilitating correlation of the suppression signals and the analyser results at a later stage. The circuit comprises an electromagnetic relay 67 having normally open contacts 68 and 69, which are operated in conjunction with normally open contacts 70 of the relay 21, and make-before-break changeover contacts 71, operated by the analyser programmer 36 once per analysis cycle when the comparison of the latest and latest but one control signals takes place. At this point in the analysis cycle, the contacts 71 are in the energised position and if the contacts 70 are closed (i.e. a control signal is being suppressed) the relay 67 operates, closing the contacts 68. Thus, when the contacts 71 return to the de-energised position, the relay 67 will be either energised or de-energised, according to whether the last control signal was suppressed or not. The contacts 69 of the relay 67 activate an alarm device 72 which may be a visual or aural indicator or an event pen recorder.

Figure 5:
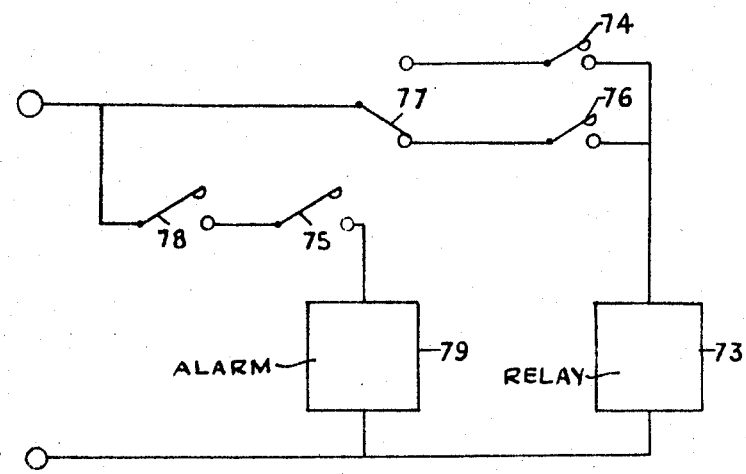

The alarm circuit shown in FIG. 5 operates in conjunction with that shown in FIG. 4 and is activated only when two successive control signals are suppressed by the equipment. This means that although a single control signal which differs from the previous signal by too great an amount is suppressed, it is considered to be a transient fault not requiring any action, but if two successive signals are suppressed, an alarm is activated. The circuit comprises an electromagnetic relay 73 having normally open contacts 74 and 75 which are operated in conjunction with normally open contacts 76 of the relay 67, and make-before-break changeover contacts 77 which, like the contacts 71, are operated by the analyser programmer 36 once per analysis cycle when the comparison of the latest and latest but one control signals takes place. The relay 73 is energised immediately subsequent to a comparison period, via the contacts 77 which are in the de-energised position, only if the contacts 76 of the relay 67 are closed, indicating that the latest control signal has been suppressed during the comparison period. If already energised, the relay 73 is held no during the subsequent comparison period by means of the contacts 77, which are in the energised position, and the contacts 74. Thus, the relay 73 is energised in the comparison period immediately subsequent to the one in which a control signal has been suppressed. If the control signal is suppressed again, the path formed by normally open contacts 78 of the relay 21 and by the normally open contacts 75 of the relay 73 is closed allowing an alarm device 79, which may be a visual or aural indicator, to be activated. The relay 73 is "slugged" slightly, by means of a resistance-capacitance network (not shown), to ensure that at the precise end of the analysis cycle, no overlap between the operation of this relay and the de-energisation of the relay 21, operated by the Schmitt trigger circuit, occurs, which could, under certain conditions, erroneously energise the alarm device 79.

If a single isolated suppression takes place, the relay 67 resets at the beginning of the subsequent comparison period and the relay 73 at the end of that period.

What we claim is:

1. A process control apparatus for continuously monitoring a series of two consecutive stepwise process control signals, comprising two potentiometers on which said two consecutive signals of a continuous sequence of process control signals are represented as the respective positions of the potentiometer sliders, which potentiometers are connected in a bridge circuit so that the potential difference between the sliders is proportional to the difference between the consecutive control signals, and including means responsive to the said potential difference to suppress the later of the two consecutive signals when the said potential difference exceeds a predetermined value.

2. Apparatus as claimed in claim 1 wherein the two potentiometers are connected respectively to detect and store the process control signals.

3. Apparatus as claimed in claim 2 and including potentiometer resetting means operative on receipt of a satisfactory control signal to adjust the slider of the storage potentiometer from a position corresponding to the earlier signal to a position corresponding to the position of the detector potentiometer receiving the later signal, thereby to store the later signal and to release said detector potentiometer for receiving the next control signal.

4. Apparatus as claimed in claim 1 wherein said potentiometers have servo-driven sliders.

5. Apparatus as claimed in claim 1 wherein the signal suppression means responsive to the difference between consecutive signals comprises a Schmitt trigger circuit arranged to receive a signal corresponding to the said difference so as to "trigger" to a condition to suppress the process control signal if the difference signal exceeds the predetermined value.

6. Apparatus as claimed in claim 5 and including a differential amplifier through which the difference signal may be applied to the Schmitt trigger circuit.

7. Apparatus as claimed in claim 5 and including an electromagnetic relay arranged for actuation by the Schmitt trigger circuit to prevent alteration of the process control setting when the difference signal exceeds the predetermined value.

8. Apparatus as claimed in claim 1 and including in circuit an alarm means responsive to the receipt of a first or a predetermined number of consecutive faulty signals.

9. Apparatus as claimed in claim 8 wherein the alarm means is arranged to be actuated by the "triggering" of the schmitt trigger circuit.

10. Apparatus as claimed in claim 8 wherein the alarm means comprises an electromagnetic relay in circuit with means to record actuation of the relay.

11. Apparatus as claimed in claim 1 comprising means to override actuation of the control signal suppression means for an initial control cycle to allow the process to establish characteristic process conditions.

12. Apparatus as claimed in claim 11 wherein the override means comprises an electromagnetic relay associated with the process control signal and relay-locking means arranged to lock the relay initially and to unlock the relay automatically after the receipt of one or more control signals.

13. Apparatus as claimed in claim 12 wherein the relay locking means comprises a transistorised locking circuit and a bistable circuit arranged to alter its conducting conditions so as to permit actuation of the electromagnetic relay after the desired interval.

14. Apparatus as claimed in claim 13 wherein the switching circuit is manually actuated and arranged to be reset automatically after an initial control cycle.

References Cited

UNITED STATES PATENTS

| | | | |
|---|---|---|---|
| 2,684,459 | 7/1954 | Brown et al. | 318—18 XR |
| 2,782,347 | 2/1957 | Herbst | 318—29 |
| 2,820,935 | 1/1958 | Kleason | 318—29 |
| 2,846,629 | 8/1958 | Clark et al. | 318—28 |
| 3,166,691 | 1/1965 | McGee | 318—28 XR |
| 3,175,190 | 3/1965 | Gasser | 318—162 XR |

B. DOBECK, Primary Examiner

U.S. Cl. X.R.

318—28